(12) United States Patent
Kuroishi et al.

(10) Patent No.: US 10,499,773 B2
(45) Date of Patent: Dec. 10, 2019

(54) BACTERIA REMOVING WATER DISCHARGE DEVICE

(71) Applicant: TOTO LTD., Kitakyushu-shi, Fukuoka (JP)

(72) Inventors: Masahiro Kuroishi, Kitakyushu (JP); Takamasa Suzuki, Kitakyushu (JP); Yusuke Nogoshi, Kitakyushu (JP); Kenta Suzuki, Kitakyushu (JP); Muneyuki Urata, Kitakyushu (JP); Koki Nagano, Kitakyushu (JP); Yukiko Yano, Kitakyushu (JP); Yusuke Nakamura, Kitakyushu (JP)

(73) Assignee: TOTO LTD., Kitakyushu-Shi, Fukuoka (JP)

(*) Notice: Subject to any disclaimer, the term of this patent is extended or adjusted under 35 U.S.C. 154(b) by 124 days.

(21) Appl. No.: 15/559,523

(22) PCT Filed: Mar. 8, 2016

(86) PCT No.: PCT/JP2016/057237
§ 371 (c)(1),
(2) Date: Sep. 19, 2017

(87) PCT Pub. No.: WO2016/152509
PCT Pub. Date: Sep. 29, 2016

(65) Prior Publication Data
US 2018/0117640 A1   May 3, 2018

(30) Foreign Application Priority Data

Mar. 20, 2015 (JP) .................................. 2015-057721
Feb. 29, 2016 (JP) .................................. 2016-038270

(51) Int. Cl.
*A47K 4/00* (2006.01)
*B08B 3/02* (2006.01)
(Continued)

(52) U.S. Cl.
CPC ................ *A47K 4/00* (2013.01); *B08B 3/024* (2013.01); *B08B 3/08* (2013.01); *B08B 3/10* (2013.01);
(Continued)

(58) Field of Classification Search
CPC .. E03D 9/08; E03D 9/085; B08B 3/08; B08B 3/10; B08B 3/02; B08B 3/024;
(Continued)

(56) References Cited

U.S. PATENT DOCUMENTS 3,742,520 A * 7/1973 Bernardi ................. E03D 9/002
4/662
3,747,129 A * 7/1973 Dyar ....................... E03D 9/002
134/167 R (Continued)

FOREIGN PATENT DOCUMENTS

GB      1588500 A * 4/1981 ............... A61L 2/18
JP      08-232329 A   9/1996
(Continued)

OTHER PUBLICATIONS

International Search Report for PCT/JP2016/057237 dated May 31, 2016.
(Continued)

*Primary Examiner* — Erin Deery
(74) *Attorney, Agent, or Firm* — Pearne & Gordon LLP

(57) ABSTRACT

A bacteria removing water discharge device used for a water supply facility is provided. The device includes: a bacteria removing water generating part denaturing tap water to generate bacteria removing water; a bacteria removing water discharge part, the part including a water storage part storing the bacteria removing water temporally, a water discharge port discharging the bacteria removing water stored in the water storage part onto a water receiving part of the water
(Continued)

supply facility; and a controller, the controller executing a bacteria removing mode discharging the bacteria removing water from the bacteria removing water discharge part to the water receiving part, and a residual water drain mode draining at least a portion of the bacteria removing water remained in the water storage part after executing the bacteria removing mode.

2 Claims, 14 Drawing Sheets

(51) Int. Cl.
  *B08B 3/08* (2006.01)
  *B08B 3/10* (2006.01)
  *C02F 1/467* (2006.01)
  *C02F 1/461* (2006.01)
  *C02F 1/50* (2006.01)
  *C02F 1/78* (2006.01)

(52) U.S. Cl.
  CPC .......... *C02F 1/4618* (2013.01); *C02F 1/4674* (2013.01); *C02F 1/505* (2013.01); *C02F 1/78* (2013.01); *C02F 2303/04* (2013.01); *C02F 2307/06* (2013.01); *C02F 2307/14* (2013.01)

(58) Field of Classification Search
  CPC ....... B08B 9/093; A47K 4/00; C02F 2307/06; C02F 2307/17
  USPC ......... 239/102.1, 102.2; 4/662; 134/34, 172, 134/198
  See application file for complete search history.

(56) References Cited

U.S. PATENT DOCUMENTS

| | | | | |
|---|---|---|---|---|
| 3,755,826 A | * | 9/1973 | Roberts | ............... E03D 9/002 4/662 |
| 6,550,080 B1 | * | 4/2003 | Grewal | ............... A47K 3/281 4/601 |

FOREIGN PATENT DOCUMENTS

| | | | |
|---|---|---|---|
| JP | 09-220273 A | | 8/1997 |
| JP | 2008-168230 A | | 7/2008 |
| JP | 2008168231 A | * | 7/2008 |

OTHER PUBLICATIONS

English translation for JP 2008-168231 published on Jul. 24, 2008 in the name of Toto Ltd.

* cited by examiner

θ2+θ3=θ1

BACTERIA REMOVING WATER DISCHARGE DEVICE

TECHNICAL FIELD

An aspect of the invention generally relates to a bacteria removing water discharge device.

BACKGROUND ART

For example, dirt such as scum of soap or shampoo used for washing of a human body, and grime (protein related, carbohydrate related, oils and fats, salts or the like) generated from the human body adhere to a wash place floor of a bath room. A washing device for removing bacteria due to the dirt like this has been proposed.

In the washing device disclosed in the Patent Document 1, a water discharge part capable of discharging is provided below a counter of the bath room. In the washing device like this, it is possible to remove bacteria from the wash place floor by discharging bacteria removing water from the water discharge part onto the wash place floor.

PRIOR ART DOCUMENT

Patent Document

[Patent Document 1] JP 2008-168230 A (Kokai)

SUMMARY OF INVENTION

Problem to be Solved by Invention

In order to remove bacteria from a water receiving part (for example, wash place floor of bath room, floor of shower room, sink of kitchen, bowl portion of wash stand, hand washer and toilet bowl) of a water supply facility with a smaller amount of bacteria removing water, it is necessary to ensure a time for the bacteria removing water to operate the bacteria on the water supply part. For this, it is important to discharge the bacteria removing water in a bathtub of high retentivity (for example mist). For that reason, it is necessary to make a diameter of a water discharge port provided in the water discharge part small.

In the case where the bacteria removing water is discharged from the water discharge port with a small diameter like this, the bacteria removing water is likely to remain on a flow channel up to the water discharge port. This is because the bacteria removing water is difficult to be drained due the small diameter of the water discharge port. The bacteria removing water remained on the flow channel of the water discharge part in this way may be discharged onto the water receiving part after the water receiving part is dried after the operation of the device is finished. For example, there is a fear that the residual bacteria removing water is discharged on to the water receiving part by vibration when the user opens a door and vibration of pipes generated due to the use of other water supply equipment.

Since the amount of the discharged bacteria removing water is relatively small, it is difficult for the bacteria removing water to flow and arrive at a drain port on the water receiving part having a loose drain gradient. In the case where the bacteria removing water remained on the flow channel in the water discharge part is discharged onto the dry water receiving part, the bacteria removing water results in staying as polka-dotted residual water. Since the polka-dotted residual water has a large amount of water to a surface area, it is hard to dry, and has remained without drying naturally even though the next day. For example, in the case of the wash place floor, this results in that when the user cleans the bathtub on the next day, socks are wet when standing on the wash place floor in the bath room with wearing the socks. The user feels uncomfortable and troublesome because of having to take off the socks every cleaning.

The invention has been made based on the recognition of such a problem, and an object of the invention is to provide a bacteria removing water generation device capable of preventing generation of the polka-dotted residual water on the water receiving part after a long time passes from operation finish of the bacteria removing water discharge device and the water receiving part dries even if the bacteria removing water is discharged in an aspect of high retentivity.

Means for Solving Problem

The first invention is a bacteria removing water discharge device used for a water supply facility, the device comprising: a bacteria removing water generating part denaturing tap water to generate bacteria removing water; a bacteria removing water discharge part, the part including a water storage part storing the bacteria removing water temporally, a water discharge port discharging the bacteria removing water stored in the water storage part onto a water receiving part of the water supply facility; and a controller, the controller executing a bacteria removing mode discharging the bacteria removing water from the bacteria removing water discharge part to the water receiving part, and a residual water drain mode draining at least a portion of the bacteria removing water remained in the water storage part after executing the bacteria removing mode.

According to this bacteria removing water discharge device, after the bacteria removing mode is executed, the bacteria removing water remained in the water storage part is drained. Immediately after the bacteria removing mode is executed, a water film is formed of the bacteria removing water on the water receiving part. For this reason, the bacteria removing water drained from the bacteria removing water discharge part in the residual drain mode drops on the water film. Thereby, the bacteria removing water drained from the bacteria removing water discharge part can be flown to the drain port with the bacteria removing water forming the water film. Even if the bacteria removing water is discharged in a water discharge form with high retentivity in order to remove bacteria from the water receiving part with a less amount of bacteria removing water, it is possible to prevent that the residual water is generated on the water receiving part after a long time passes from operation finish of the bacteria removing water discharge device.

The second invention is the bacteria removing water discharge device in the invention 1, wherein the controller vibrates the bacteria removing water discharge part in the residual water drain mode.

According to this bacteria removing water discharge device, a surface tension of the bacteria removing water remained in the water storage part can be reduced by vibrating the bacteria removing water discharge part. Thereby, the bacteria removing water remained in the bacteria removing water discharge part can be drained.

The third invention is the bacteria removing water discharge device in the invention 2, wherein the residual water drain mode includes a first vibration step, in the first vibration step the bacteria removing water discharge part is vibrated while changing a position of the water discharge port so that the bacteria removing water remained in the water storage part drops on the water receiving part.

According to this bacteria removing water discharge device, it is possible to increase a planar area of a region where the bacteria removing water drops on the water receiving part by changing the position where the bacteria removing water remained in the water storage part drops on the water receiving part. For this reason, it is possible to increase the possibility that the bacteria removing water dropped from the bacteria removing water discharge part contacts the water film on the water receiving part. Thereby, the bacteria removing water drained from the bacteria removing water discharge part can be introduced certainly to the drain port with the bacteria removing water forming the water film.

The fourth invention is the bacteria removing water discharge device in the invention 3, wherein the residual water drain mode includes a second vibration step, the second vibration step is executed after the first vibration step, in the second vibration step a vibration different from a vibration generated in the bacteria removing water discharge part in the first vibration step is generated in the bacteria removing water discharge part.

According to this bacteria removing water discharge device, in the second vibration step, the vibration different from the first vibration step is generated in the bacteria removing water discharge pert. For this reason, the bacteria removing water which cannot be drained in the first vibration step can be drained in the second vibration step. Thereby, the amount of the bacteria removing water remained in the water storage part can be reduced.

The fifth invention is the bacteria removing water discharge device in the invention 4, wherein the controller moves the position of the water discharge port in multiple directions in the second vibration step, and a range of movement of the water discharge port in the second vibration step is narrower than a range of movement of the water discharge port in the first vibration step.

According to this bacteria removing water discharge device, shaking stronger than the first vibration step is generated on the water discharge port in the second vibration step. For this reason, the amount of the bacteria removing water remained in the water storage part can be further reduced.

EMBODIMENTS OF INVENTION

Figure 1:
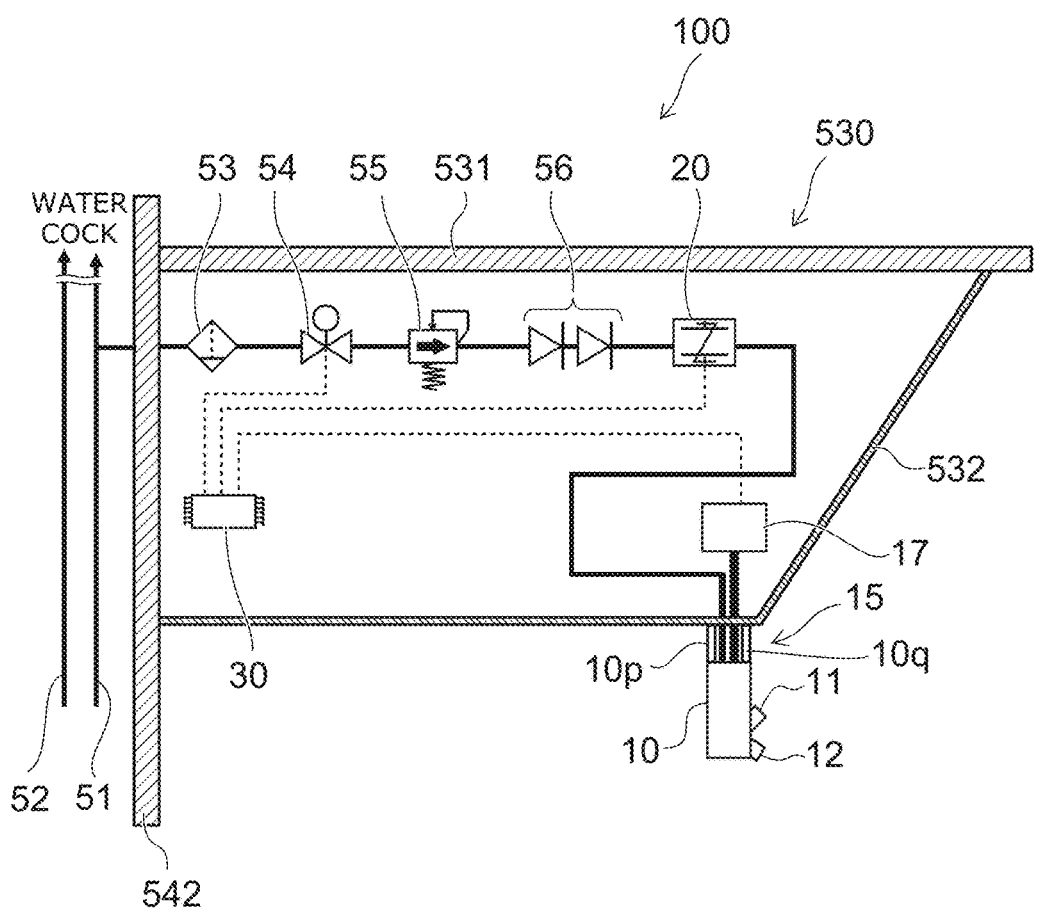
FIG. 1 is a schematic view illustrating a bacteria removing water discharge device for a bath room wash place according to an embodiment of the invention.

Embodiments of the invention will now be described with reference to the drawings. Note that the same numerals are applied to similar constituent elements in the drawings and detailed descriptions of such constituent elements are appropriately omitted.

FIG. 1 is a schematic view illustrating a bacteria removing water discharge device for a bath room wash place according to an embodiment of the invention.

As shown in FIG. 1, a bacteria removing water discharge device for a bath room wash place (hereinafter, referred to as simply "bacteria removing water discharge device" for convenience of the description) 100 includes a bacteria removing water discharge part 10, a bacteria removing water generating part 20, and a controller 30. The bacteria removing water discharge device 100 is located in the bath room, and is a device removing bacteria from the wash place floor of the bath room.

Firstly, an example of the bath room in which the bacteria removing water discharge device 100 is located will be described.

Figure 2A:
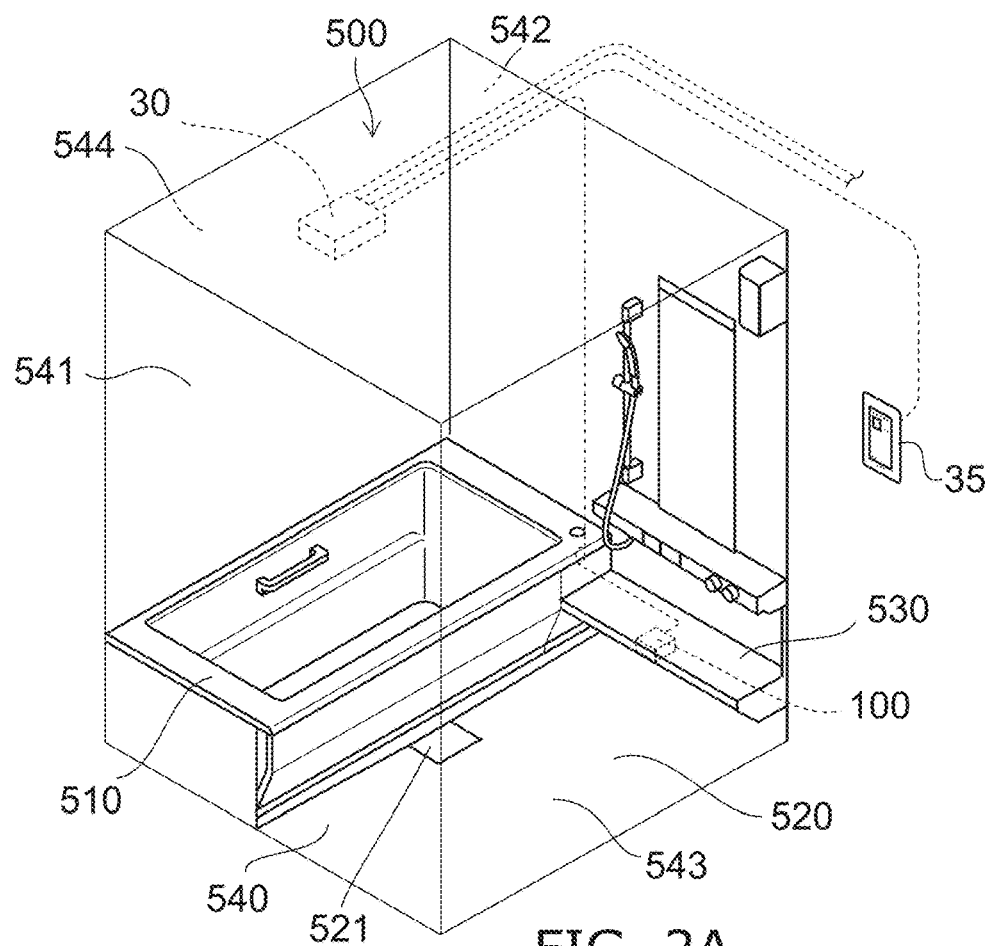
FIG. 2A and FIG. 2B are schematic perspective views showing a bath room in which the bacteria removing water discharge device for the bath room wash place according to the embodiment is located.
Figure 2B:
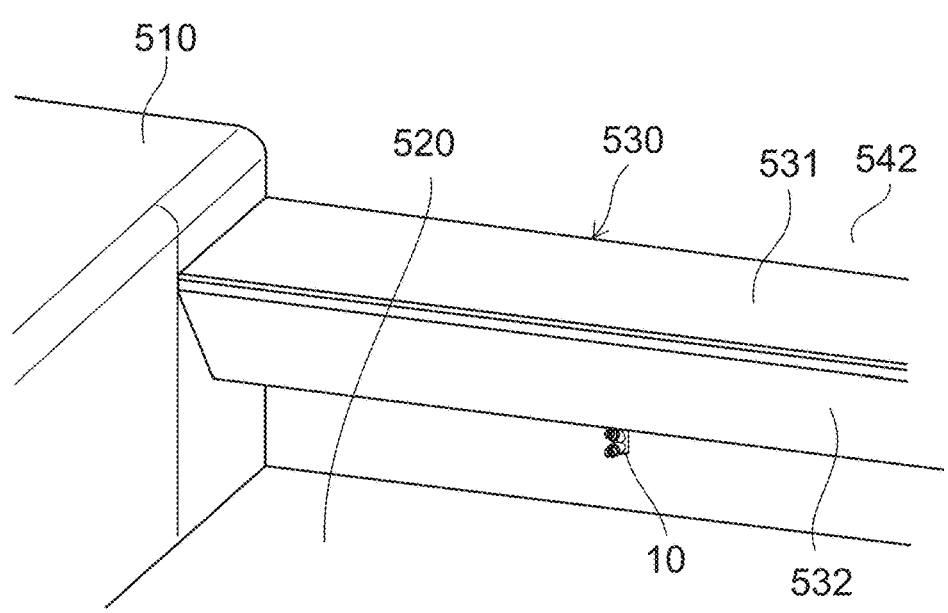

FIG. 2A and FIG. 2B are schematic perspective views showing the bath room in which the bacteria removing water discharge device for the bath room wash place according to the embodiment is located.

As shown in FIG. 2A, the bath room 500 in which the bacteria removing water discharge device is located is provided with first to fourth walls 541 to 544, a bathtub 510, a wash place floor 520 and a counter 530. Furthermore, the bath room 500 is appropriately provided with a mirror, a water supply cock, a shower hose or the like. FIG. 2B is a schematic perspective view enlarging a vicinity of the counter 530.

The bath room 500 has the first to fourth walls 541 to 544. The second wall 542 is a wall facing the first wall 541. The fourth wall 544 is a wall facing the third wall 543. The first wall 541 and the second wall 542 are connected to the third wall 543 and the fourth wall 544, respectively.

The bathtub 510 is provided on a side of the fourth wall 544 as seen from the wash place floor 520. For example, the bathtub 510 is disposed to connect with the fourth wall 544.

The wash place floor 520 is provided between the bathtub 510 and the third wall 543. For example, the wash place floor 520 contacts the first to third walls 541 to 543.

The wash place floor 520 is surrounded by wall surfaces 540 which stand around the wash place floor 520. Here, "wall surfaces" include not only the first to fourth walls 541 to 544 but also a side face of the bathtub 510. In this example, the wall surfaces 540 surrounding the wash place floor 520 are side faces of the first to third walls 541 to 543 and the bathtub 510. The first to fourth walls 541 to 544 may include a door of the bath room or the like.

In the specification, a direction from the second wall 542 toward the first wall 541 is taken as "forward", and a direction opposite to it is taken as "backward". A perpendicular direction to a front-back direction and an up-and-down direction is taken as a lateral direction.

The wash place floor 520 is provided with a drain port 521. The drain port 521 is provided on an end of the wash place floor 520 on the bathtub 510 side, the end being near the center of the wash place floor 520 in the front-back direction. The wash place floor 420 is provided with a loose gradient toward the drain port 521.

The counter 530, the mirror, the water supply cock and the shower hose are attached on the second wall 542. The counter 530 has a counter main body, and a supporting material 533 (see FIG. 5A). The counter main body is, for example, has a top plate 531 and a lower cover 532.

The counter 530 is disposed spaced upward from the wash place floor 520. The supporting material 533 is attached to the second wall 542, and the counter main body is attached to this supporting material. The counter has a generally rectangular shape when viewed from above. A width of the counter 530 in the lateral direction is equal to a width of the wash place floor 520 in the lateral direction.

The bacteria removing water discharge part 10 is provided under the counter 530. The bacteria removing water discharge part 10 is disposed at a position spaced from the wash place floor 520. The bacteria removing water discharge part 10 is located, for example, near the center of the counter 530 in the lateral direction. That is, the bacteria removing water discharge part 10 is located near the center of the wash place floor 520 in the lateral direction. Thereby, the bacteria removing water is easy to be discharged over the whole of the wash place floor 520.

FIG. 1 shows a side view of the vicinity of the counter 530 in which the bacteria removing water discharge device 100 is located. For example, bacteria removing water discharge part 10 is provided so as to protrude downward from the lower cover 532.

The water supply pipe 51 and a hot-water supply pipe 52 are provided outside the bath room 500 (for example, behind the second wall 542). The water supply pipe 51 is connected to a water supply pipe not shown. The tap water is supplied from the water supply pipe 51 to the bacteria removing water discharge device 100.

A stop cock 53, a solenoid valve 54, a pressure regulator valve 55, a check valve 56, the bacteria removing water generating part 20, and the controller 30 are provided inside the counter 530 (between the top plate 531 and the lower cover 532). The stop cock 53 is connected with the water supply pipe 51. In the flow channel of the tap water supplied from the water supply pipe, the stop cock 53, the solenoid valve 54, the pressure regulator valve 55, the check valve 56, the bacteria removing water generating part 20 are connected in order from the upstream side.

In the embodiment, at least a portion of the stop cock 53, the solenoid valve 54, the pressure regulator valve 55, the check valve 56, the bacteria removing water generating part 20, and the controller 30 may be provided outside the counter 530 or outside the bath room 500. For example, as shown in FIG. 2a, the controller 30 may be provided outside the bath room 500.

Supply of the tap water to the downstream side is controlled by opening/closing of the stop cock 53 and the solenoid valve 54. The solenoid valve 54 performs action of opening the flow channel of the tap water, or action of closing the flow channel of the tap water.

The pressure regulator valve 55 controls a pressure of the supplied tap water. Thereby, a flow rate of the tap water supplied to the bacteria removing water generating part 20 can be regulated. The flow rate of the bacteria removing water supplied to the bacteria removing water discharge part 10 is regulated by regulating the flow rate of the tap water supplied to the bacteria removing water generating part 20. The flow rate may be regulated by using the solenoid valve 54.

The bacteria removing water generating part 20 is an electrolytic cell having an anode and a cathode. The bacteria removing water generating part 20 applies a voltage between the anode and the cathode and electrolyzes the tap water flowing between the anode and the cathode. Thereby, the bacteria removing water generating part 20 denatures the tap water to generate the bacteria removing water.

The bacteria removing water is, for example, water containing hypochlorous acid. Since the tap water contains chloride ion, hypochlorous acid is generated by electrolyzing the chloride ion. As a result, the electrolyzed water changes to liquid containing hypochlorous acid.

The bacteria removing water may be metal ion water (for example, water containing metal ion such as silver ion, copper ion or zinc ion) or water containing ozone. For example, when the tap water is electrolyzed, acid ($H^+$) is consumed at the cathode, and pH increases at the vicinity of the cathode. That is, alkaline water is generated at the vicinity of the cathode. On the other hand, alkali (Oft) is consumed at the vicinity of the anode, and pH decreases at the vicinity of the anode. That is, acidic water is generated at the vicinity of the anode. A concentration of components contained in the bacteria removing water can be controlled by changing the flow rate in the bacteria removing water generating part 20. The bacteria removing water generating part 20 is not limited to the electrolytic cell. For example, the bacteria removing water may be bacteria removing water generated by dissolving bacteria removing agent into the tap water.

The bacteria removing water generated in the bacteria removing water generating part 20 is supplied to the bacteria removing water discharge part 10, and is discharged onto the wash place floor 520 from the bacteria removing water discharge part 10. Thereby, the bacteria on the wash place floor 520 can be removed.

The bacteria removing water discharge part 10 has, for example, a motor 17. The motor 17 is, for example, a stepping motor. As described later, by rotating the bacteria removing water discharge part 10 by the motor 17, a direction of the bacteria removing water discharged can be changed.

The controller 30 is connected with the solenoid valve 54, the bacteria removing water generating part 20, and the bacteria removing water discharge part 10 (motor 17). The controller 30 can control aspect (water discharge method, way of water sprinkling) of the bacteria removing water discharged by controlling the operations of the solenoid valve 54, the bacteria removing water generating part 20, and the bacteria removing water discharge part 10.

For example, the solenoid valve 54 performs opening/closing the flow channel of the tap water based on a signal from the controller 30. Thereby, the flow rate of the tap water supplied to the downstream side is controlled. The bacteria removing water generating part 20 switches ON/OFF of the electrolytic cell based on the signal from the controller 30. The bacteria removing water discharge part 10 changes a rotation angle and a rotation speed based on the signal from the controller 30. In this way, the controller 30 can control the concentration of bacteria removing water, the instantaneous flow rate (flow rate per unit time) of the bacteria removing water, a total amount of the discharged bacteria removing water, and a water discharge method such as a discharge direction of the bacteria removing water.

As shown in FIG. 2A, an operation part 35 connected with the controller 30 is provided inside the bath room 500 or outside the bathroom 500. The user of the bacteria removing water discharge device 100 can operate the action of the bacteria removing water discharge device by using this operation par 35.

Dirtiness of the wash place floor 520 and flowability of the bacteria removing water may be different depending on a part of the wash place floor 520. Then, the controller 30 changes the discharge method of the bacteria removing water depending on an angle of rotation of the bacteria removing water discharge part 10 (direction in which the bacteria removing water is discharged). Thereby, optimum discharge can be performed depending on the art of the wash place floor. Thereby, bacteria removing of the wash place floor can be performed efficiently with a smaller amount of bacteria removing water.

Next, an example of the bacteria removing water discharge part according to the embodiment will be described with reference to FIG. 3A to FIG. 5B.

Figure 3A:
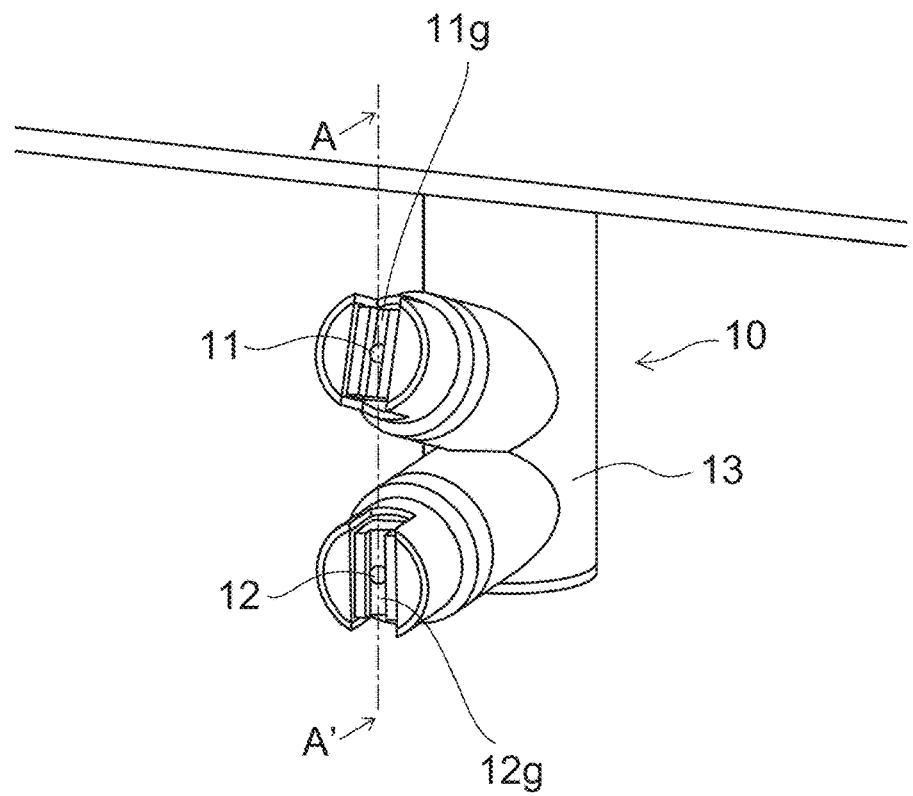
FIG. 3A and FIG. 3B are schematic views illustrating a bacteria removing water discharge part of the embodiment.
Figure 3B:
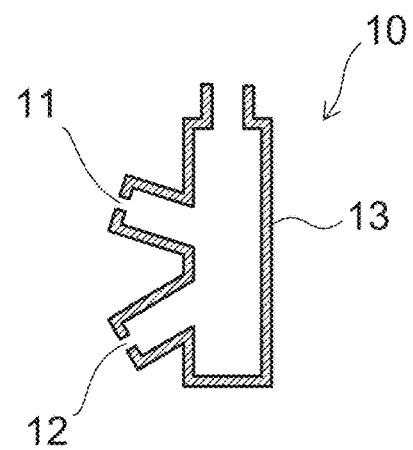

FIG. 3A and FIG. 3B are schematic views illustrating the bacteria removing water discharge part of the embodiment. FIG. 3A is a schematic perspective view of the bacteria removing water discharge part 10. FIG. 3B is a schematic cross-sectional view at A-A' cross section plane shown in FIG. 3A.

As shown in FIG. 3A and FIG. 3B, the bacteria removing water discharge part 10 has a first water discharge port 11 and a second water discharge port 12, and a water storage part 13.

The water storage part 13 is, for example, cylindrical, and can store temporally the bacteria removing water supplied from the bacteria removing water generating part 20 to the inner space. The first water discharge port 11 and the second water discharge port 12 are provided on a side face of the water storage part 13. The first water storage port 11 is provided above the second water discharge port.

The space where the bacteria removing water in the water storage part 13 stays is communicated with the outside via the first water discharge port 11 and the second water discharge port 12. Thereby, the first water discharge port 11 and the second water discharge port 12 discharge the bacteria removing water staying in the water storage part 13 onto the wash place floor. For example, the first water discharge port 11 and the second water discharge port 12 discharge the bacteria removing water simultaneously. By providing the water storage part 13, the bacteria removing water can be stored temporally and a water discharge pressure can be increased.

Figure 4A:
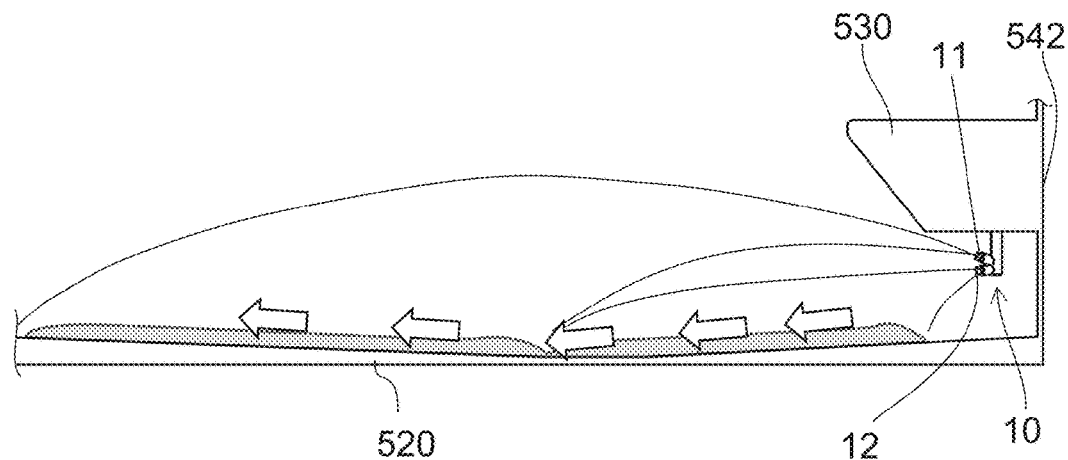
FIG. 4A and FIG. 4B are schematic side views illustrating a state in which the bacteria removing water is discharged from the bacteria removing water discharge part of the embodiment.
Figure 4B:
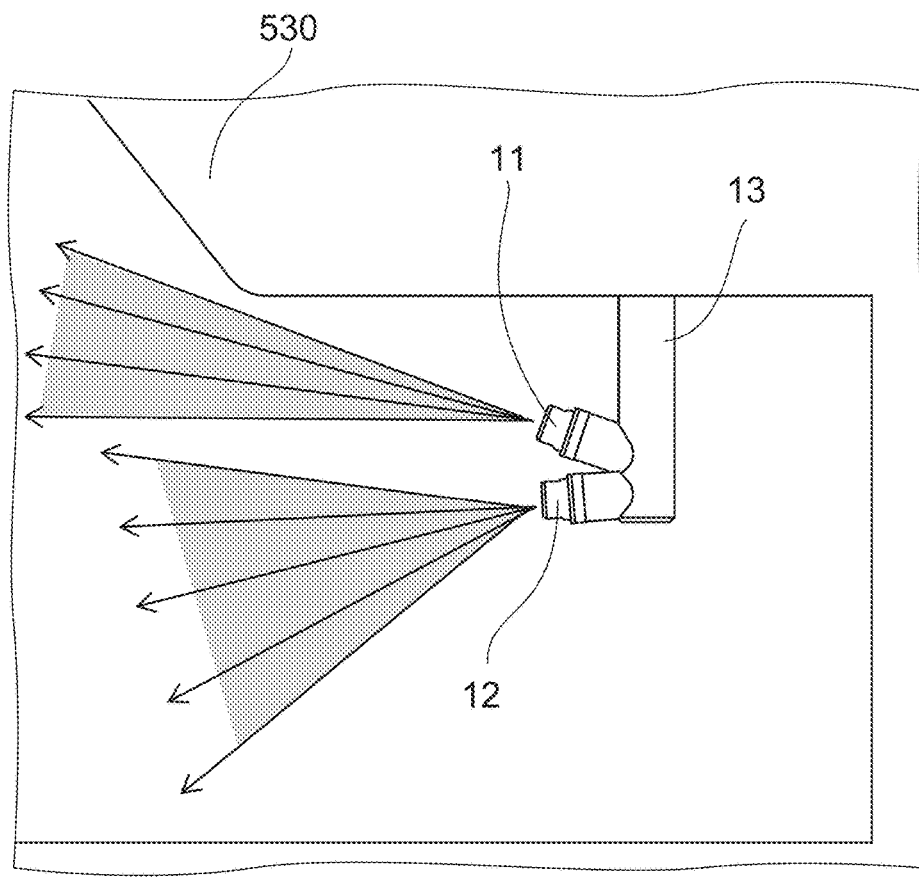

FIG. 4A and FIG. 4B are schematic side views illustrating a state in which the bacteria removing water is discharged from the bacteria removing water discharge part of the embodiment. FIG. 4B shows the enlarged vicinity of the bacteria removing water discharge part 10.

The first water discharge port 11 is provided upwards than the second water discharge port 12. For example, the first water discharge port 11 is oriented upwards than the horizontal direction, and the second water discharge port 12 is oriented downwards than the horizontal direction. Thereby, the bacteria removing water discharged from the first water discharge port 11 arrives at a farther region from the bacteria removing water discharge part 10 than the bacteria removing water discharge from the second water discharge port 12. The first water discharge port 11 is a water discharge port for distant corresponding to far range from the bacteria removing water discharge part 10 of the wash place floor 520. The second water discharge port 12 is a water discharge port for neighborhood corresponding to near range from the bacteria removing water discharge part 10 of the wash place floor 520.

The maximum water discharge distance of the first water discharge port 11 (a longest distance between the bacteria removing water discharge part 10 and the position where the bacteria removing water discharged from bacteria removing water discharge part 10 without an obstacle; shooting range) is longer than the maximum distance between the bacteria removing water discharge part 10 and the wall surfaces 540.

In this example, the direction in which the bacteria removing water is discharged from the second water discharge port 12 is a direction along the direction in which the bacteria removing water is discharged from the first water discharge port 11. For example, the water discharge direction of the first water discharge port 11 is substantially the same as the water discharge direction of the second water discharge port 12. In the specification, "water discharge direction" is assumed to refer to the direction in which the bacteria removing water is discharged when viewed from above. In the case where the bacteria removing water is discharged broadly in multiple directions when viewed from above, the center of the multiple directions can be "water discharge direction".

Since diameters of the first water discharge port 11 and the second water discharge port 12 are small, the bacteria removing water is discharged, for example, in mist. The bacteria removing water like this is likely to stay on the wash place floor. By discharging the bacteria removing water in an aspect of high retentivity, a time for the bacteria removing water to operate on the bacteria on the wash place floor can be ensured. Thereby, bacteria removing of the wash place floor can be performed with a smaller amount of bacteria removing water.

As shown in FIG. 3A, the bacteria removing water discharge part 10 is provided with a groove 11g along the up-and-down direction in the vicinity of the first water discharge port 11. The direction in which the bacteria removing water is discharged from the first water discharge port 11 is controlled by the groove 11g. Similarly, the direction in which the bacteria removing water is discharged from the second water discharge port 12 is controlled by a groove 12g along the up-and-down direction provided in the vicinity of the second water discharge port 12. Thereby, as shown in FIG. 4B, the bacteria removing water is discharged broadly in the up-and-down direction from the first water discharge port 11 and the second water discharge port 12.

Figure 5A:
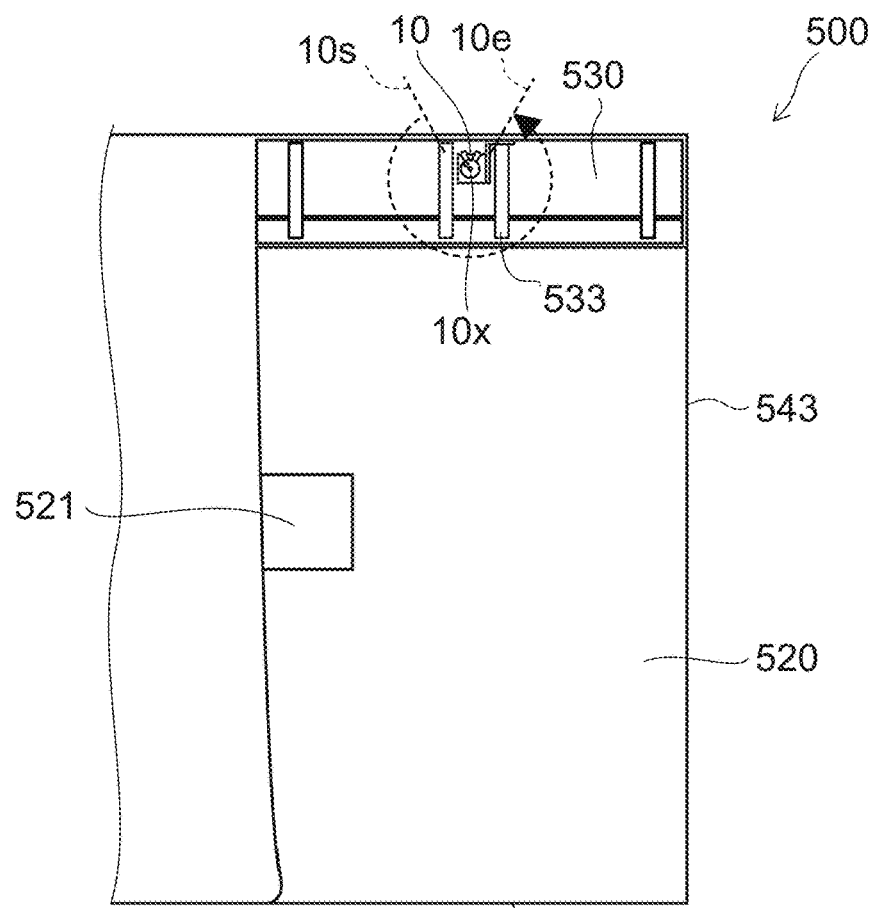
FIG. 5A and FIG. 5B are schematic views describing rotation of the bacteria removing water discharge part of the embodiment.
Figure 5B:
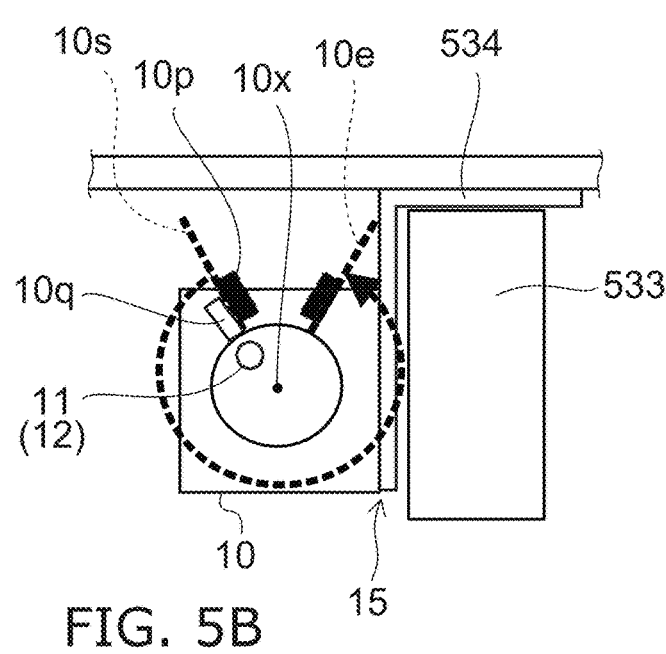

FIG. 5A and FIG. 5B are schematic views describing rotation of the bacteria removing water discharge part of the embodiment.

FIG. 5A is a schematic plan view seen from above of the wash place floor 520 and the counter 530 provided with the bacteria removing water discharge part 10. FIG. 5B is a schematic plan view showing the enlarged vicinity of the bacteria removing water discharge part 10.

The bacteria removing water discharge part 10 can rotate around a rotation axis 10x. The rotation axis 10x is an axis extending in the vertical direction. The rotation axis 10x is placed at generally the center of the bacteria removing water discharge part 10 when viewed from above. The extending direction of the rotation axis 10x may be slanted from the perfect vertical direction. For example, a vertical direction component of the extending direction of the rotation axis 10x may be larger than a horizontal direction component of the extending direction of the rotation axis 10x.

The bacteria removing water discharge part 10 can rotate from an origin 10s of the rotation (start position of rotation) to an end position 10e of the rotation. The water discharge direction of the bacteria removing water discharged from the first water discharge port 11 and the second water discharge port 12 changes depending on the rotated angle of the bacteria removing water discharge part 10. The bacteria removing water is discharged over the whole of the wash place floor 520 by discharging the bacteria removing water while the bacteria removing water discharge part 10 is rotating.

The bacteria removing water discharge device 100 according to the embodiment further includes a rotation reference defining means 15 defining a relative disposition between the wash place floor 520 and a reference position when the bacteria removing water discharge part 10 rotates (hereinafter, referred to as "rotation reference" for convenience of the description). For example, the origin 10s can be the rotation reference. The rotation reference defining means 15 is a means which defines the rotation reference so as to be a prescribed angle to the wash place floor 520.

For example, as shown in FIG. 5B, the bacteria removing water discharge device 100 is provided with a rotation reference part 10p, and a rotation reference defining part retentivity. The bacteria removing water discharge part 10 is provided with a protrusion 10q. The rotation reference part 10p and the rotation reference defining part retentivity can be used as the rotation reference defining means 15.

The rotation reference defining part retentivity is a member of which position is directly or indirectly fixed to the counter 530. The rotation reference defining part retentivity is provided on the counter 530. The rotation reference defining part retentivity is attached, for example, to the supporting material 533 of the counter 530. The rotation reference defining part retentivity may be another member from the counter 530, and may be formed integrally with the counter 530.

The rotation reference part 10p is a member of which position is directly or indirectly fixed to the rotation reference defining part retentivity. For example, the rotation reference part 10p is attached to the rotation reference defining part retentivity. Thereby, the rotation reference part 10p is relatively fixed to the counter 530.

The protrusion 10q is a member provided on the side face of the bacteria removing water discharge part 10, and rotates with the first water discharge port 11 and the second water discharge port 12. When the bacteria removing water discharge part 10 rotates, the protrusion 10q is disposed so as to strike the rotation reference part 10p. In this way, the rotation of the bacteria removing water discharge part 10 is restricted by the rotation reference part 10p and the protrusion 10q. Thereby, the position of the rotation reference part 10p can be taken as the rotation reference. The relative disposition between the rotation reference and the counter 530 is defined by the rotation reference defining means retentivity.

The rotation reference part 10p may be a portion of the counter 530, and may be molded integrally with the counter 530. In such a case, the rotation reference part 10p unites the rotation reference defining means retentivity.

For example, when the bacteria removing water discharge part is attached to the counter of the bath room, there is a fear that the rotation reference of the bacteria removing water discharge part shifts from the prescribed position. There is a fear that when the way of water sprinkling of the bacteria removing water is changed by the rotation angle of the bacteria removing water discharge part, if the rotation reference of the bacteria removing water discharge part shifts, optimum way of water sprinkling of the bacteria removing water according to the part is impossible. In contrast, in the embodiment, the rotation reference defining means 15 described above is provided. The rotation reference of the bacteria removing water discharge part 10 can be fitted against the wash place floor 520 by the rotation reference defining means 15. For this reason, it is possible to prevent that the bacteria removing water discharge part 10 is attached to the counter in a state of the rotation reference shifted from the prescribed position. Thereby, the optimum discharge according to the part of the wash place floor can be performed certainly.

In general, the counter is attached to the bath room so that the center of the counter in the lateral direction coincides with the center of a short side of the wash place floor in the lateral direction. That is, the relative disposition of the counter to the wash place floor is defined beforehand. Then, in the embodiment, the position of the bacteria removing water discharge part 10 is defined to the counter 530. Specifically, the rotation reference part 10p and the rotation reference defining part retentivity are provided and the relative disposition of the rotation reference part 10p and the rotation reference defining part retentivity to the counter 530 is defined. Thereby, the relative disposition of the rotation reference to the wash place floor 520 can be defined. Thereby, the optimum discharge can be performed certainly depending on the respective parts of the wash place floor.

Even if the position where the bacteria removing water discharge part 10 is attached to the counter changes depending on the type of the counter, if the rotation reference defining part retentivity is formed on the counter with consideration of the relationship the center of the counter to the position where the bacteria removing water discharge part 10 is attached, the rotation reference corresponding to the wash place floor can be defined. Thereby, even for various types of counters having mutually different mounting positions of the bacteria removing water discharge part 10, the optimum discharge according to the respective parts of the wash place floor 520 can be performed.

Next, an example of the operation of the bacteria removing water discharge device 100 when removing bacteria from the wash place floor 520 will be described.

Figure 6:
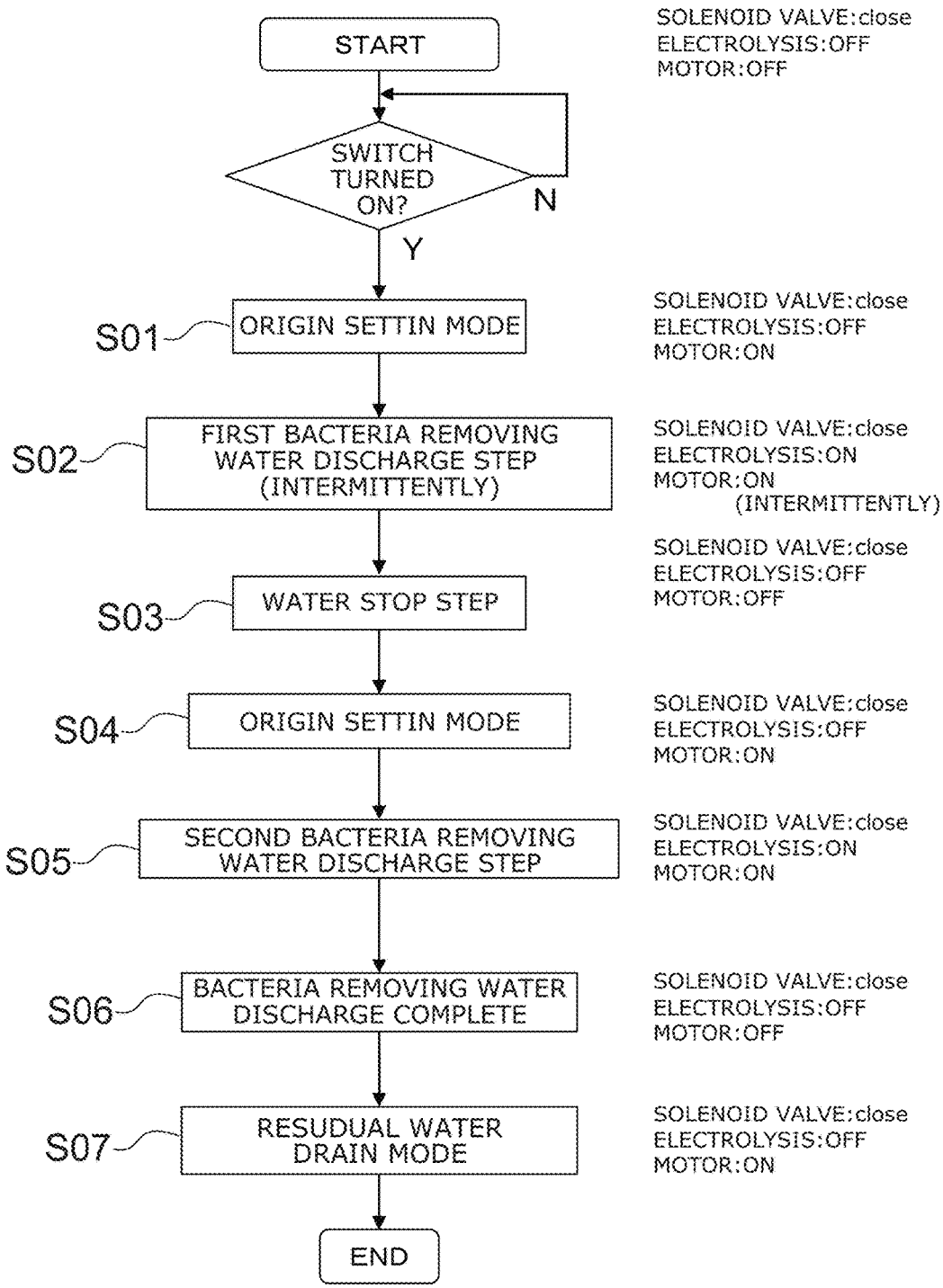
FIG. 6 is a flow chart illustrating the operation of the bacteria removing water discharge device according to the embodiment.

FIG. 6 is a flow chart illustrating the operation of the bacteria removing water discharge device according to the embodiment.

Figure 7:
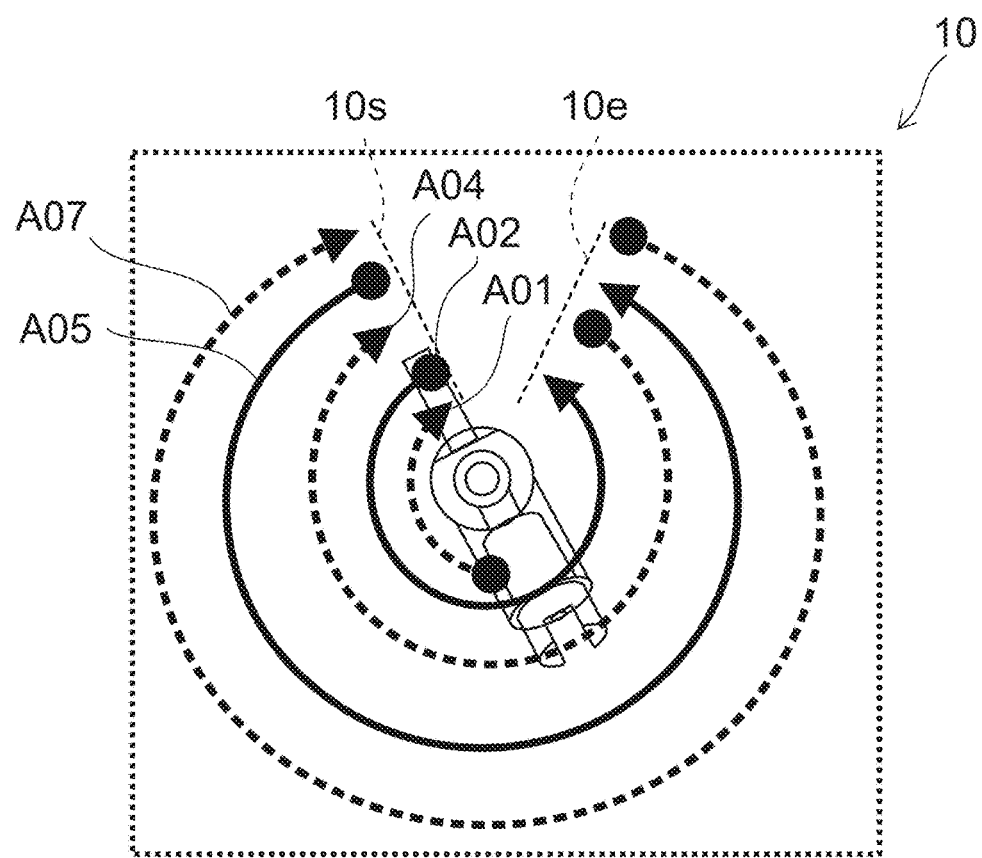
FIG. 7 is a schematic plan view illustrating the operation of the bacteria removing water discharge part of the embodiment.

FIG. 7 is a schematic plan view illustrating the operation of the bacteria removing water discharge part of the embodiment.

FIG. 7 shows the rotation operation of the bacteria removing water discharge part 10 in the respective steps of a bacteria removing method using the bacteria removing water discharge device 100.

As shown in FIG. 6, firstly, when the switch of the bacteria removing water discharge device 100 is in OFF state, the solenoid valve 54 is closed, and the electrolytic cell (bacteria removing water generating part 20) and the motor 17 is in OFF state.

Here, for example, the switch of the bacteria removing water discharge device 100 is turned ON by the user, an execution command of a wash place bacteria removing mode (bacteria removing water discharge step described later) is sent to the controller 30. At this time, the controller 30 executes firstly an origin setting mode S01 before executing the wash place bacteria removing mode.

In the origin setting mode S01, the controller 30 performs origin setting of the rotation of the bacteria removing water discharge part 10 by using the rotation reference defining means 15. Here, "origin setting" refers to the operation causing the position (direction) of the bacteria removing water discharge part 10 to correspond to the rotation reference. Specifically, the controller 30 sets the motor 17 to ON (operation condition), and rotates the bacteria removing water discharge part 10 in a direction shown by an arrow A01 of FIG. 7.

Figure 8A:
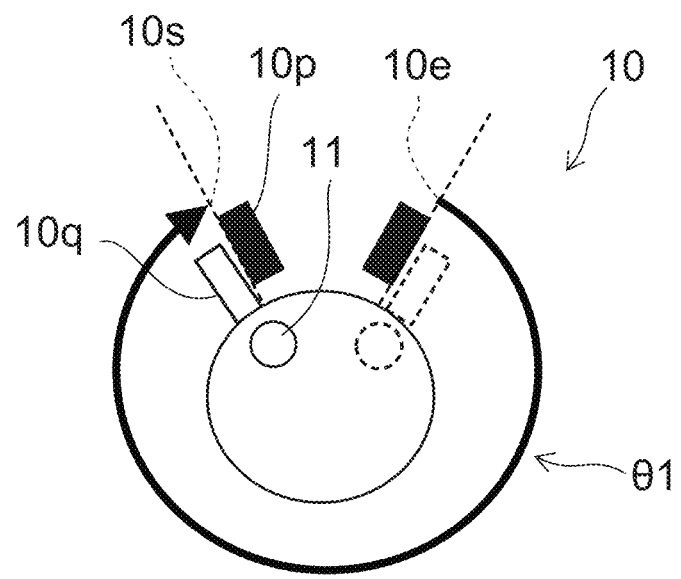
FIG. 8A and FIG. 8B are schematic plan views describing origin setting in the embodiment.
Figure 8B:
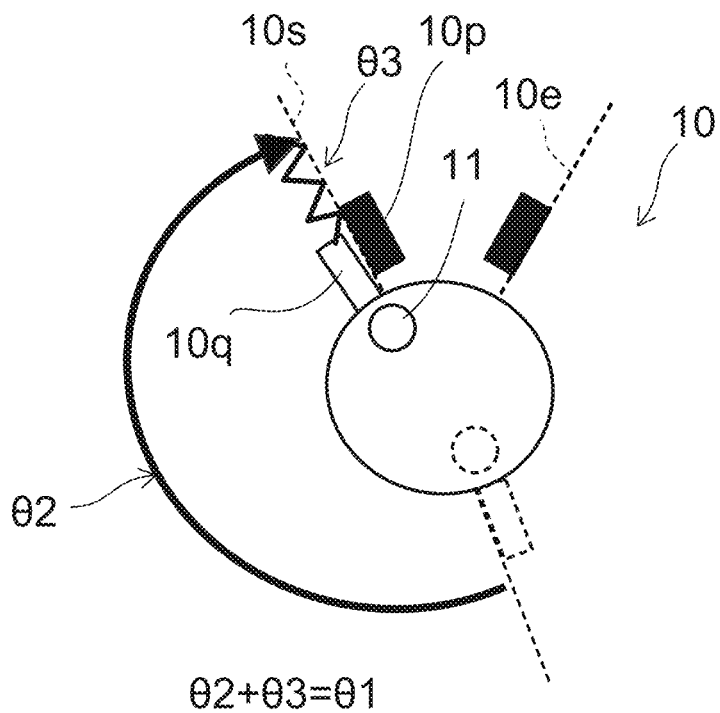

FIG. 8A and FIG. 8B are schematic plan views describing origin setting in the embodiment. FIG. 8A and FIG. 8B show the operation of the bacteria removing water discharge part 10.

As shown in FIG. 8A, an angle (maximum rotation angle $\theta 1$) from the origin $10s$ to the end position $10e$ is, for example, approximately 300°. In the origin setting mode S01, the controller 30 sends a signal to the motor 17 so as to rotate by the maximum rotation angle $\theta 1$.

As shown in FIG. 8B, for example, when the switch of the bacteria removing water discharge device 100 is turned ON, a rotation angle of the bacteria removing water discharge part 10 from the origin $10s$ is assumed to be $\theta 2$. At this time, firstly, the bacteria removing water discharge part 10 rotates by the angle $\theta 2$. Thereby, the protrusion $10q$ of the bacteria removing water discharge part 10 strikes the rotation reference part $10p$. Furthermore, the motor 17 runs idle by a difference (angle $\theta 3$) between the maximum rotation angle $\theta 1$ and the angle $\theta 2$. Thereby, the direction of the bacteria removing water discharge part 10 is certainly fitted against the origin $10s$ (rotation reference).

Next, the controller 30 executes a first bacteria removing water discharge step S02. In the first bacteria removing water discharge step S02, the solenoid valve 54 is opened and the tap water is supplied to the electrolytic cell. The electrolytic cell is set to ON state, and denatures the tap water to generate the bacteria removing water. The generated bacteria removing water is discharged from the bacteria removing water discharge part 10 to the wash place floor 520. At this time, the controller 30 sets the motor 17 to ON, and rotates the bacteria removing water discharge part 10 from the origin $10s$ to the end position $10e$ as shown by an arrow A02 of FIG. 7. The bacteria removing water discharge part 10 discharges the bacteria removing water to the wash place floor 520 while rotating.

In the respective arrows shown in FIG. 7, when the bacteria removing water discharge part 10 rotates in directions shown by dotted lines, the bacteria removing water discharge part 10 does not discharge the bacteria removing water. When the bacteria removing water discharge part 10 rotates in directions shown by solid lines, the bacteria removing water discharge part 10 discharges the bacteria removing water.

Next, a water stop step S03 is executed. In the water stop step S03, the solenoid valve 54 is closed and the electrolytic cell is set to OFF (stop condition). The motor 17 is also set to OFF (stop condition).

Next, the controller 30 executes an origin setting mode S04. In the origin setting mode S04, the controller 30 performs the origin setting of the bacteria removing water discharge part 10. The controller 30 sets the motor 17 to ON, and rotates the bacteria removing water discharge part 10 from the end position $10e$ to the origin $10s$ as shown by an arrow A04 of FIG. 7. At this time, the bacteria removing water discharge part 10 does not discharge the bacteria removing water.

After that, the controller 30 executes a second bacteria removing water discharge step S05. In the second bacteria removing water discharge step S05, the solenoid valve 54 is opened and the electrolytic cell is set to ON. The controller 30 rotates the bacteria removing water discharge part 10 by the motor 17. The bacteria removing water discharge part 10 discharges the bacteria removing water while rotating from the origin $10s$ to the end position $10e$ as shown by an arrow A05 of FIG. 7. The discharge method of the bacteria removing water in the second bacteria removing water discharge step S05 may be different from the first bacteria removing water discharge step S02. For example, the components and concentration of the bacteria removing water discharged in the second bacteria removing water discharge step S05 may be different from the components and concentration of the bacteria removing water discharged in the first bacteria removing water discharge step S02.

Next, a bacteria removing water discharge completing step S06 is executed. In the bacteria removing water discharge completing step S06, the solenoid valve 54 is closed and the electrolytic cell is set to OFF, and the motor 17 is set to OFF.

Next, the controller 30 executes a residual water drain mode S07. In the residual water drain mode S07, at least a portion of the bacteria removing water remained in the flow channel of the bacteria removing water in the bacteria removing water discharge part 10 is drained. For example, the bacteria removing water remained in the flow channel from the water storage part 13 to the first water discharge port 11 or in the flow channel from the water storage part 13 to the second water discharge port 12 is drained. Specifically, the controller 30 controls the motor 17 and vibrates the bacteria removing water discharge part 10. The bacteria removing water discharge part 10 rotates while vibrating from the end position $10e$ to the origin $10s$ as shown by an arrow A07 of FIG. 7.

For example, when the bacteria removing water discharge device 100 is not used, the angle of the bacteria removing water discharge part 10 to the wash place floor 520 may shift by hitting of a body of the user to the bacteria removing water discharge part 10 or the like. Even if in such a case, according to the embodiment, since the origin setting is performed before the wash place bacteria removing mode, the discharge of the bacteria removing water is started under the condition of correcting deviation of the angle shift. Thereby, the optimum water discharge can be performed stably for a long time depending on the part of the wash place floor.

If the bacteria removing water discharge device is used for a long time, a movement resistance (resistance during rotation) of the bacteria removing water discharge part 10 increases, and the angle of the bacteria removing water discharge part 10 to the wash place floor 520 may shift from the intended angle in executing the wash place bacteria removing mode. In the case where an obstacle is place around the bacteria removing water discharge part 10, when the bacteria removing water discharge part 10 rotates, the bacteria removing water discharge part 10 may hit the obstacle. Also in this case, the angle of the bacteria removing water discharge part 10 to the wash place floor 520 may shift from the intended angle.

In contrast, in the embodiment, the origin setting mode S04 is executed between the first bacteria removing water discharge step S02 and the second bacteria removing water discharge step S05. That is, the controller 30 executes the origin setting mode in the middle of the wash place bacteria removing mode. Thereby, the shift of the angle of the bacteria removing water discharge part 10 to the wash place floor 520 can be corrected in the middle of the wash place bacteria removing mode. For this reason, it is possible to prevent the bacteria removing water from being discharged under the condition of a large angle shift of the bacteria removing water discharge part 10 to the wash place floor 520. Thereby, the optimum water discharge can be performed stably for a long time depending on the part of the wash place floor.

Next, the operation of the bacteria removing water discharge device in the first bacteria removing water discharge step S02 is further described with reference to FIG. 9 to FIG. 11B.

Figure 9:
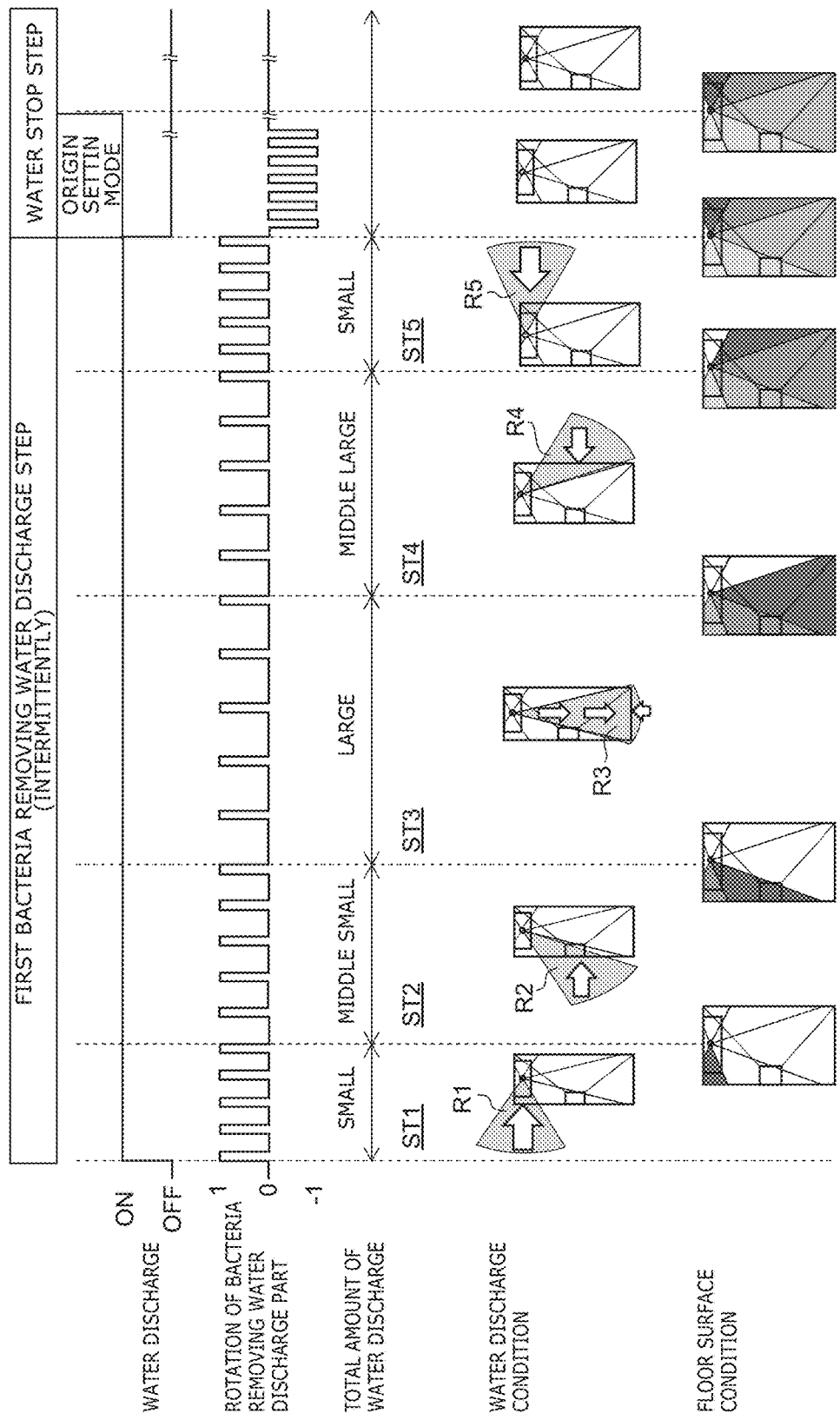
FIG. 9 is a time chart describing the operation of the bacteria removing water discharge device in the embodiment.

FIG. 9 is a time chart describing the operation of the bacteria removing water discharge device in the embodiment.

FIG. 9 shows the operations in the first bacteria removing water discharge step S02 and the origin setting mode S04.

As shown in FIG. 9, in first bacteria removing water discharge step S02, the bacteria removing water is continuously discharged from the bacteria removing water discharge part 10. In the origin setting mode S04 of the water stop step S03, the bacteria removing water is not discharged from the bacteria removing water discharge part 10.

In "the rotation of the bacteria removing water discharge part" of the time chart, "1" represents the rotation of the bacteria removing water discharge part 10 from the origin 10s to the end position 10e (regular rotation operation), "0" represents stop of the rotation of the bacteria removing water discharge part 10, and "−1" represents the rotation of the bacteria removing water discharge part 10 from the end position 10e to the origin 10s (reverse rotation operation).

As shown in FIG. 9, the bacteria removing water discharge part 10 repeats rotation and stop. In the bacteria removing water discharge step S02, the bacteria removing water discharge part 10 rotates intermittently in the direction from the origin 10s toward the end position 10e. In the origin setting mode S04, the bacteria removing water discharge part 10 rotates intermittently in the direction from the end position 10e toward the origin 10s.

Figure 10:
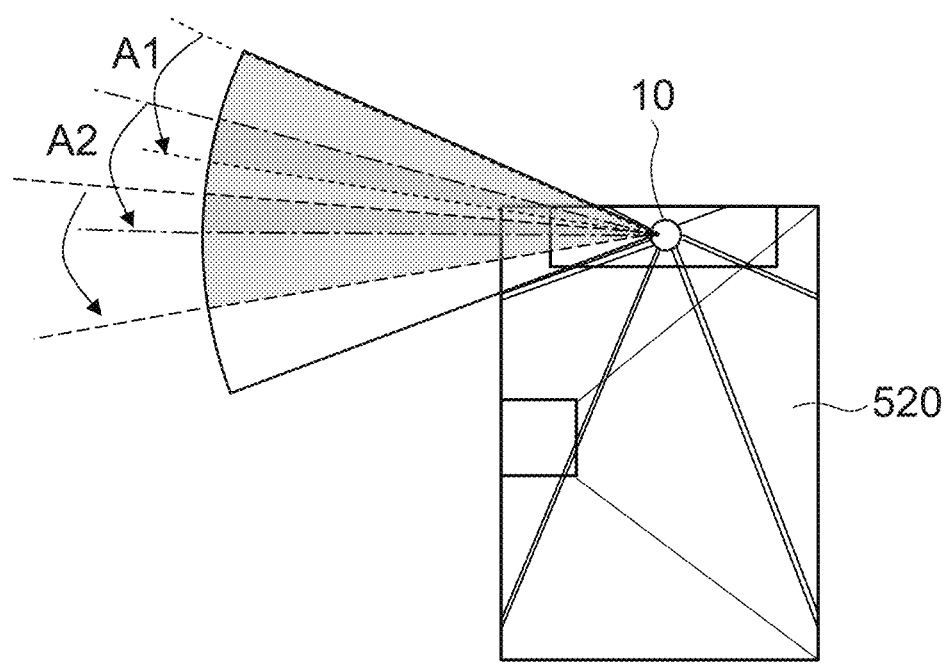
FIG. 10 is a schematic plan view illustrating the operation of the bacteria removing water discharge part of the embodiment.

FIG. 10 is a schematic plan view illustrating the operation of the bacteria removing water discharge part of the embodiment.

A region A1 represents a region where the bacteria removing water is discharged in a period t1 during which the bacteria removing water discharge part 10 stops rotation. A region A2 represents a region where the bacteria removing water is discharged in a period t2 during which the bacteria removing water discharge part 10 stops rotation next to the period t1. As shown in FIG. 10, a portion of the region A2 overlaps a portion of the region A1. In this way, the bacteria removing water discharge part 10 rotates intermittently from the origin 10s to the end position 10e.

In the embodiment furthermore, the bacteria removing water discharge device 100 changes the amount of the discharged bacteria removing water and the rotation speed of the bacteria removing water discharge part 10 depending on the part of the wash place floor 520. The description about this will be described in the following.

Figure 11A:
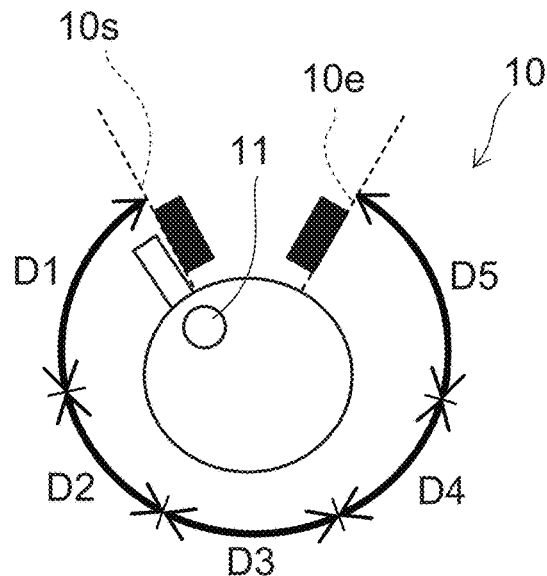
FIG. 11A and FIG. 11B are schematic plan views describing the operation of the bacteria removing water discharge part of the embodiment.
Figure 11B:
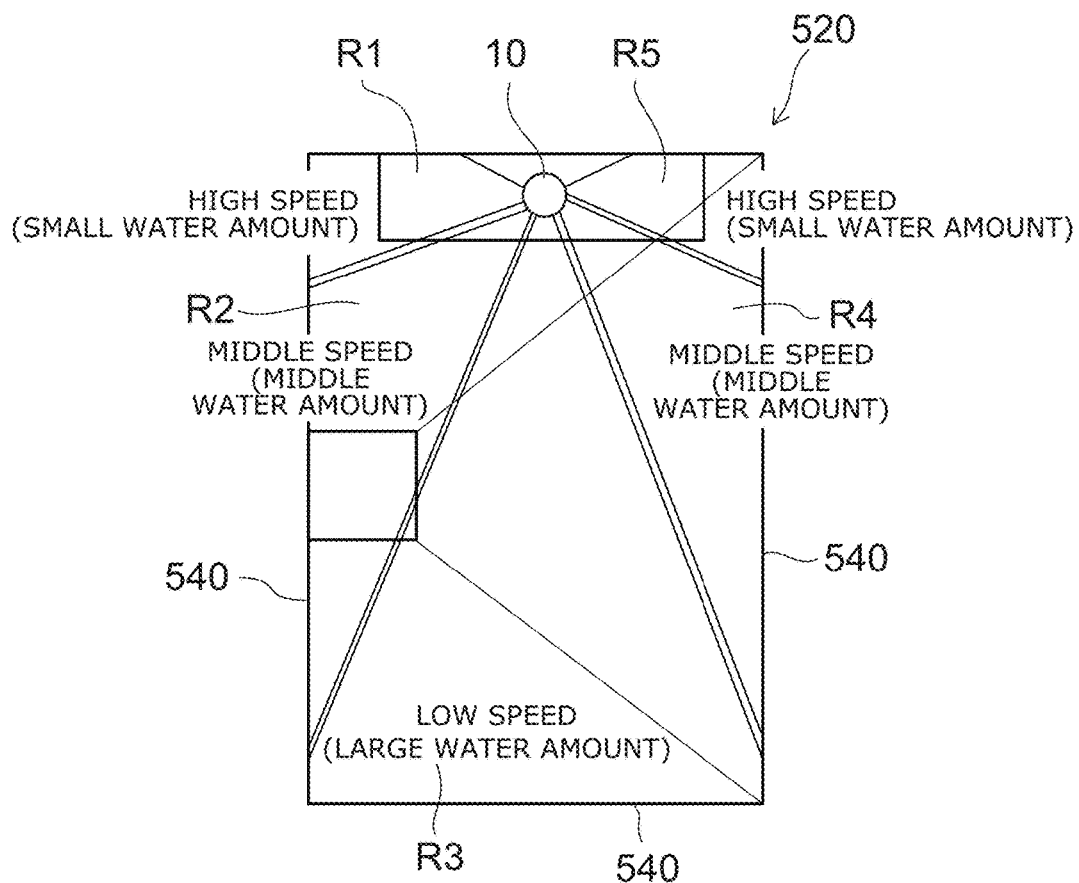

FIG. 11A and FIG. 11B are schematic plan views describing the operation of the bacteria removing water discharge part of the embodiment.

FIG. 11A is a schematic plan view illustrating the bacteria removing water discharge part 10, and FIG. 11B is a schematic plan view illustrating the wash place floor 520.

As shown in FIG. 11A, in this example, the angle of rotation of the bacteria removing water discharge part 10 (rotation angle) is divided into mutually different five ranges D1 to D5. FIG. 11B shows regions R1 to R5 of the wash place floor 520 corresponding to the ranges D1 to D5, respectively.

For example, in a state ST1 of the rotation angle within the range D1, the bacteria removing water is discharged in the region R1. In a state ST2 of the rotation angle within the range D2, the bacteria removing water is discharged in the region R2.

A distance from the bacteria removing water discharge part 10 to the wall surfaces 540 along the water discharge direction in the state ST1 is shorter than a distance from the bacteria removing water discharge part 10 to the wall surfaces 540 along the water discharge direction in the state ST2. At this time, as shown in FIG. 9, the controller 30 makes the total amount of the bacteria removing water discharged in the state ST1 less than the total amount of the bacteria removing water discharged in the state ST2.

In the same way, in a state ST3 of the rotation angle within the range D3, the bacteria removing water is discharged in the region R3. A distance from the bacteria removing water discharge part 10 to the wall surfaces 540 along the water discharge direction in the state ST3 is longer than a distance from the bacteria removing water discharge part 10 to the wall surfaces 540 along the water discharge direction in the state ST2. At this time, the controller 30 makes the total amount of the bacteria removing water discharged in the state ST3 more than the total amount of the bacteria removing water discharged in the state ST2.

In this way, in the embodiment, the total amount of the bacteria removing water discharged in a rotation angle region in which the distance between the bacteria removing water discharge part 10 and the wall surfaces 540 is relatively short is made less than the total amount of the bacteria removing water discharged in a rotation angle region in which the distance between the bacteria removing water discharge part 10 and the wall surfaces 540 is relatively long.

In a state ST4 of the rotation angle within the range D4, the bacteria removing water is discharged in the region R4. A distance from the bacteria removing water discharge part 10 to the wall surfaces 540 along the water discharge direction in the state ST4 is the same as a distance from the bacteria removing water discharge part 10 to the wall surfaces 540 along the water discharge direction in the state ST2. A distance between the region R4 and the drain port 521 is longer than a distance between the region R2 and the drain port 521. That is, the region R4 is located upstream side of wash place floor 520 from the region R2. In this case, the controller 30 makes the total amount of the bacteria removing water discharged in the state ST2 less than the total amount of the bacteria removing water discharged in the state ST4.

In this way, in the case where distances between the bacteria removing water discharge part 10 are the same, the amount of the bacteria removing water discharged to the downstream side of the drain gradient of the wash place floor 520 is made less than the amount of the bacteria removing water discharged to the upstream side of the drain gradient of the wash place floor 520.

For example, the instantaneous flow rate of the bacteria removing water discharged from the bacteria removing water discharge part 10 is made constant. The controller 30 changes an average rotation speed of the bacteria removing water discharge part 10 depending on the distance from the bacteria removing water discharge part 10 to the wall surfaces 540 along the water discharge direction. Thereby, the total amount of the discharged bacteria removing water can be changed depending on the part of the wash place floor. For example, the average rotation speed of the bacteria removing water discharge part 10 in the state ST1 is higher than the average rotation speed of the bacteria removing water discharge part 10 in the state ST3. Thereby, the total amount of the bacteria removing water discharged in the state ST1 is less than the total amount of the bacteria removing water discharged in the state ST3.

As shown in FIG. 9, in the case where the bacteria removing water discharge part 10 repeats rotation and stop, the average rotation speed can be changed by changing a length of the stop time of the bacteria removing water discharge part 10. For example, an angle and a time of rotation at one time of the bacteria removing water discharge part 10 is made constant, and a time period of the rotation operation is changed, and thus the average rotation speed can be changed. For example, the period of the rotation operation in the state ST1 is shorter than the period of the rotation operation in the state ST3.

In the time chart, "water discharge condition" indicates directions of the bacteria removing water discharged in the respective range of the rotation angle by schematic plan views. Arrows in the plan views indicate flow of the bacteria removing water flowing on the wash place floor 520 after hitting the wall surfaces 540 of the bacteria removing water discharged from the bacteria removing water discharge part 10. Directions of the arrows indicate schematically flowing directions of the bacteria removing water, and sizes of the arrows indicate schematically the amount of the bacteria removing water. In the time chart, "floor surface condition" indicates the amount of the bacteria removing water existing on the wash place floor 520 in the respective states by gray scale. This gray scale indicates that the color is darker (closer to black), the more the amount of the bacteria removing water is.

As described previously, the maximum water discharge distance of the discharge of the bacteria removing water from the bacteria removing water discharge part 10 is longer than the maximum distance between the bacteria removing water discharge part 10 and the wall surfaces 540. By rotating the bacteria removing water discharge part 10 in this way, it is possible to discharge the bacteria removing water over the whole of the wash place floor 520, and to remove bacteria from the whole of the wash place floor.

However, when the bacteria removing water discharge part 10 is rotated, the distance between the bacteria removing water discharge part 10 and the wall surfaces 540 along the water discharge direction changes. In such a state, if water discharge is performed similarly in all directions, a region where the bacteria removing water is discharged excessively is generated on the wash place floor 520 due to the change of the distance between the bacteria removing water discharge part 10 and the wall surfaces 540 along the water discharge direction. For this reason, a large amount of bacteria removing water becomes necessary.

On the other hand, not only the bacteria removing water directly arriving at the wash place floor 520 from the bacteria removing water discharge part 10 but also the bacteria removing water flowing on the wash place floor 520 after hitting the wall surfaces 540 has a bacteria removing effect. Then, it is possible to remove bacteria from the whole of the wash place floor 520 with a small amount of the bacteria removing water by also using the bacteria removing water which flows after hitting the wall surfaces 540 like this.

For example, in the case where the distance between the bacteria removing water discharge part 10 and the wall surfaces 540 along the water discharge direction is short like the state ST1, the amount of bacteria removing water which flows onto the wash place floor 520 after being discharged from the bacteria removing water discharge part 10 and hitting the wall surfaces 540 is relatively large. Thereby, even if the total amount of the bacteria removing water discharged in the state ST1 is reduced, the total amount of the bacteria removing water supplied per unit area can be maintained. Even if the total amount of the bacteria removing water discharged in the state ST1 is reduced, the bacteria removing effect can be obtained.

Therefore, according to the embodiment, when the distances between the bacteria removing water discharge part 10 and the wall surfaces 540 along the water discharge direction of the bacteria removing water are short, it is possible to prevent more than necessary bacteria removing water from being discharged. Thereby, the total amount of the bacteria removing water discharged to the whole of the wash place floor 520 can be reduced.

Furthermore, in the embodiment, when the distances between the bacteria removing water discharge part 10 and the wall surfaces 540 along the water discharge direction of the bacteria removing water are the same, the amount of the bacteria removing water discharged to the upstream side of the wash place floor 520 is reduced than the amount of the bacteria removing water discharged to the downstream side of the wash place floor 520. The bacteria removing water discharged to the upstream side of the wash place floor 520 flows to the downstream side of the wash place floor 520. For this reason, it is also possible to remove bacteria the downstream side of the wash place floor 520 by using the bacteria removing water discharged to the upstream side of the wash place floor 520. Thereby, even if the amount of the bacteria removing water discharged to the downstream side of the wash place floor 520 is reduced, it is possible to remove bacteria from the whole of the wash place floor 520.

When the amount of the discharged bacteria removing water is changed depending on the part on the wash place floor 520, a method of changing the instantaneous flow rate of the bacteria removing water is conceived. The instantaneous flow rate of the bacteria removing water discharged from the bacteria removing water discharge part 10 depends on the instantaneous flow rate in the bacteria removing water generating part 20. However, when the instantaneous flow rate in the bacteria removing water generating part 20 is changed, a concentration of the components of the bacteria removing water generated in the bacteria removing water generating part 20 changes. In contrast, in the embodiment, the instantaneous flow rate of the bacteria removing water is kept constant, and the average rotation speed of the bacteria removing water discharge part 10 is changed. Thereby, the total amount of the bacteria removing water discharged in the prescribed range of the wash place floor 520 can be changed under the constant concentration of the bacteria removing water.

When the average rotation speed of the bacteria removing water discharge part 10 is changed, if the rotation speed is too fast, sometimes torque may be insufficient and malfunction may occur in rotation. In contrast, in the embodiment, the controller 30 switches between the rotation state of the bacteria removing water discharge part 10 and the rotation stop state of the bacteria removing water discharge part 10. The average rotation speed is changed by changing a time length during which the rotation of the bacteria removing water discharge part 10 stops.

Next, the operation of the bacteria removing water discharge device 100 in the residual water drain mode S07 will be furthermore described with reference to FIG. 12 and FIG. 13.

Figure 12:
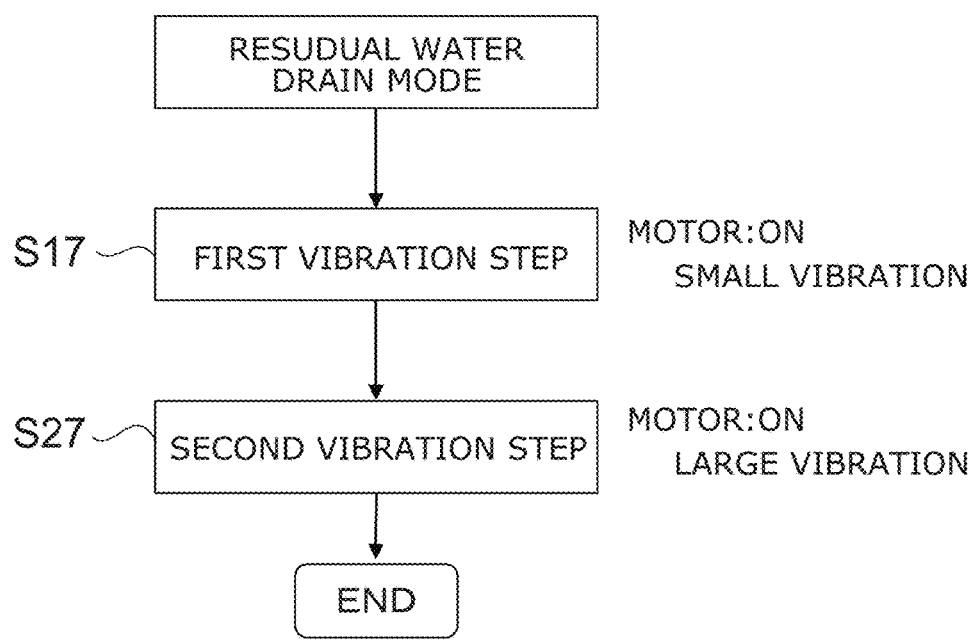
FIG. 12 is a flow chart illustrating the operation of the bacteria removing water discharge device in the embodiment.

FIG. 12 is a flow chart illustrating the operation of the bacteria removing water discharge device in the embodiment. FIG. 13 is a time chart describing the operation of the bacteria removing water discharge device in the embodiment.

Figure 13:
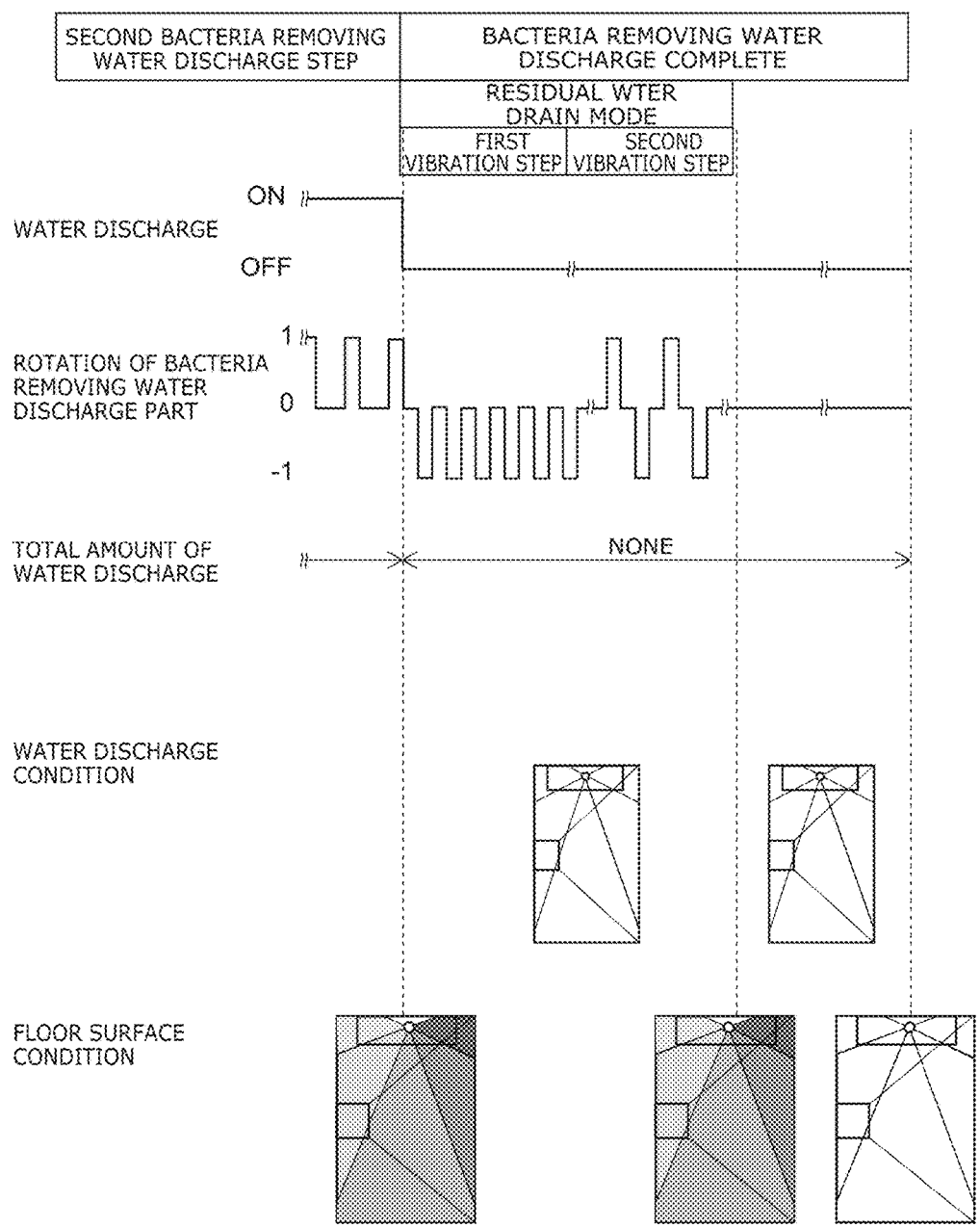
FIG. 13 is a time chart describing the operation of the bacteria removing water discharge device in the embodiment.

As shown in FIG. 12 and FIG. 13, the residual water drain mode S07 has a first vibration step S17 and a second vibration step S27 executed after the first vibration step S17.

As shown in FIG. 13, in the first vibration step S17, the bacteria removing water discharge part 10 repeats rotation and stop. The bacteria removing water discharge part 10 rotates intermittently from the end position 10e to the origin 10s. Thereby, the bacteria removing water discharge part 10 vibrates. This vibration allows a surface tension of the bacteria removing water remained in the bacteria removing water discharge part 10 to reduce (destroy). Thereby, the bacteria removing water remaining on the flow channel in the bacteria removing water discharge part 10 is drained.

The residual water drain mode S07 like this is executed immediately after the wash place bacteria removing mode (second bacteria removing water discharge step S05) is executed. Immediately after the wash place bacteria removing mode is executed, a water film is formed of the bacteria removing water on the wash place floor. Thereby, the bacteria removing water drained in the residual water drain mode S07 drops on the water film.

In the case where the amount of the bacteria removing water discharged on the wash place floor 520 is small, the bacteria removing water becomes to the polka-dotted bacteria removing water, and is difficult to flow to the drain port. On the other hand, in the case where the bacteria removing water is in the form of a film, the bacteria removing water is easy to flow to the drain port along the drain gradient of the wash place floor 520.

In the embodiment, the bacteria removing water drained from the bacteria removing water discharge part is dropped on the water film. Thereby, the bacteria removing water drained from the bacteria removing water discharge part can be flown to the drain port with the bacteria removing water forming the water film. Therefore, even if the diameter of the water discharge port is made small in order to discharge the bacteria removing water in a water discharge form with high retentivity, it is possible to prevent that the residual water occurs on the wash place floor after a long time passes after the operation of the device is finished.

Furthermore, in the first vibration step S17, the bacteria removing water discharge part 10 is rotated from the end position 10e to the origin 10s. That is, while changing the position where the bacteria removing water remained in the bacteria removing water discharge part 10 drops on, the bacteria removing water discharge part 10 is vibrated. Thereby, it is possible to increase a plane area of a region where the bacteria removing water drops on the wash place floor 520. For this reason, it is possible to increase the possibility that the bacteria removing water dropped from the bacteria removing water discharge part 10 contacts the bacteria removing water in the film form on the wash place floor 520. Thereby, the bacteria removing water drained from the bacteria removing water discharge part 10 can be introduced certainly to the drain port with the bacteria removing water forming the water film.

In the second vibrating step S27, the controller 30 causes the vibration different from the vibration generated in the bacteria removing water discharge part 10 in the first vibration step S17 to generate on the bacteria removing water discharge part 10.

Since the vibrations are different, the bacteria removing water which cannot be drained in the first vibration step S17 can be drained in the second vibration step S27. Thereby, the amount of the bacteria removing water remained in the bacteria removing water discharge part 10 can be reduced.

For example, in the second vibration step S27, the controller 30 causes the position of the water discharge ports (first water discharge port 11 and the second water discharge port 12) to move in multiple directions. That is, as shown in FIG. 13, the regular rotation operation and the reverse rotation operation repeat alternately.

In the second vibration step S27, the repetition of the regular rotation operation and the reverse rotation operation is performed after the protrusion 10q strikes the rotation reference part 10p. For this reason, a range of the movement of the water discharge port in the second vibration step is narrower than a range of the movement of the water discharge port in the first vibration step. Every time the regular rotation operation and the reverse rotation operation are repeated, the protrusion 10q strikes the rotation reference part 10p. For this reason, shaking stronger than the first vibration step is generated on the water discharge port in the second vibration step. Thereby, the amount of the bacteria removing water remained in the bacteria removing water discharge part can be further reduced.

Next, other embodiment of the invention will be described with reference to the drawings.

Figure 14A:
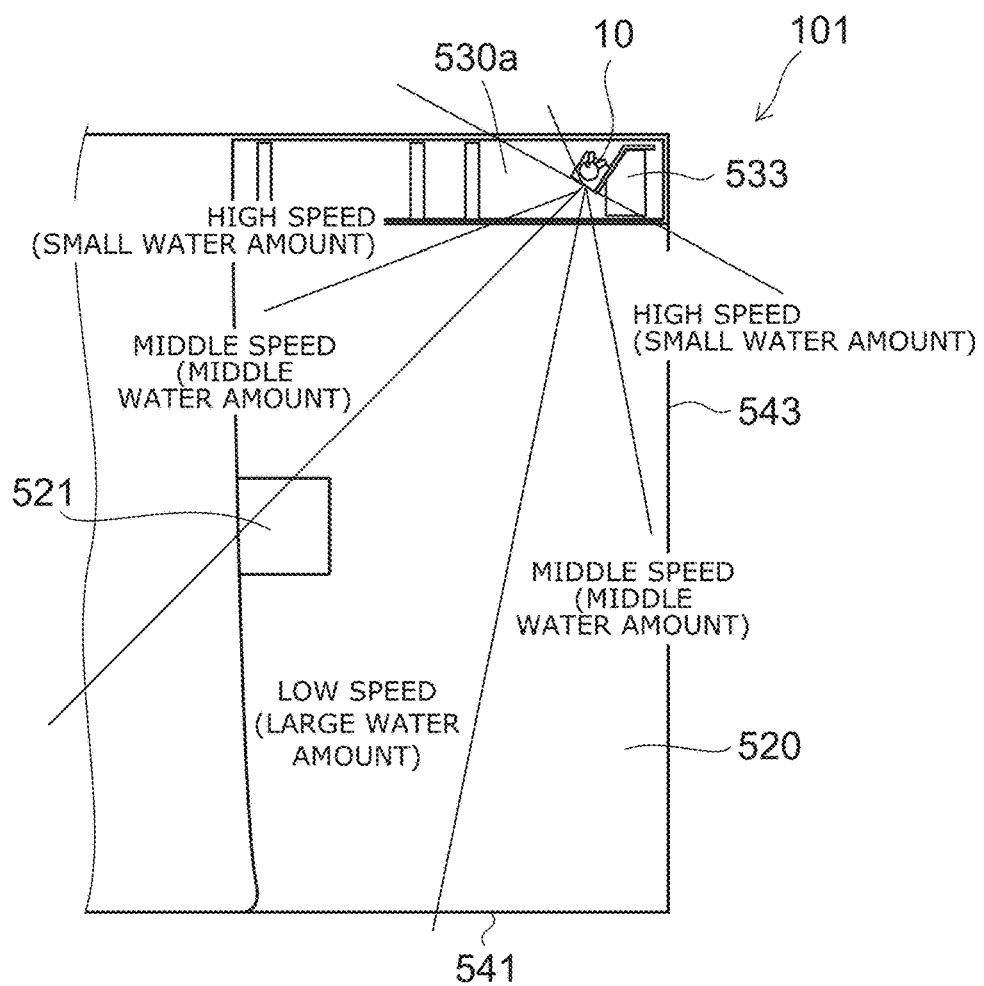
FIG. 14A and FIG. 14B are schematic plan views illustrating a bacteria removing water discharge device according to other embodiment of the invention.
Figure 14B:
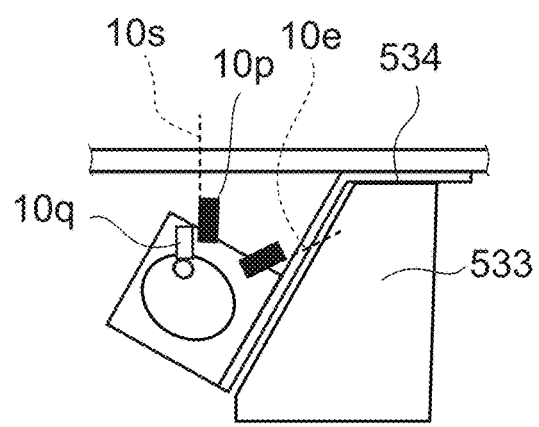

FIG. 14A and FIG. 14B are schematic plan views illustrating a bacteria removing water discharge device according to other embodiment of the invention.

FIG. 14A is a schematic plan view seen from above of a counter 530a provided with the bacteria removing water discharge part 10, and the wash place floor 520. FIG. 14B is a schematic plan view showing an enlarged vicinity of the bacteria removing water discharge part 10 in FIG. 14A.

In this example, the shape of the counter 530a provided with the bacteria removing water discharge part 10 is different from the shape of the counter 530 previously described. Along with this, the relative disposition between the wash place floor 520 and the bacteria removing water discharge part 10 is different from the example shown in FIG. 5A and FIG. 5B, for example.

The rotation reference defining part retentivity which is the rotation reference defining means 15 is attached to the supporting material 533 located at an end portion in the lateral direction of the counter 530a. For this reason, the bacteria removing water discharge part 10 is not located at near the center in the lateral direction of the counter 530a but at the end portion.

That is, in this example, the bacteria removing water discharge part 10 is provided at near the center in the lateral direction of the wash place floor 420 but at the end portion in the lateral direction of the wash place floor 520. Other than this, the bacteria removing water discharge device shown in FIG. 14A and FIG. 14B is the same as the bacteria removing water discharge device 100 described in FIG. 1 to FIG. 13.

As described previously, even if the position where the bacteria removing water discharge part 10 is attached to the counter is changed like this, if the rotation reference defining part 534 is formed on the counter with consideration of the relationship between the center of the counter and the position where the bacteria removing water discharge part 10 is attached, the rotation reference corresponding to the wash place floor can be defined. Thereby, the optimum discharge according to the respective parts of the wash place floor 520 can be performed.

Also in this case, as shown in FIG. 14A, the average rotation speed of the bacteria removing water discharge part 10 is changed depending on the distance from the bacteria removing water discharge part 10 to the wall surfaces 540 along the water discharge direction. Thereby, the total amount of the discharged bacteria removing water can be changed depending on the part of the wash place floor 520. In this way, the optimum discharge according to the respective parts of the wash place floor 520 can be performed.

The embodiment of the invention has been described with reference to specific examples. However, the invention is not limited to these specific examples. For example, those skilled in the art can suitably modify the above embodiment or examples also encompassed within the scope of the invention as long as they fall within the spirit of the invention. For example, the shape, the dimension, the material, the disposition of the components included in the bacteria removing water discharge part 10, bacteria removing water generating part 20 and the controller 30, and the disposition form or the like of the bacteria removing water discharge part 10, bacteria removing water generating part 20 and the controller 30, and the use of the bacteria removing water discharge device are not limited to the illustration and can be modified appropriately.

Specifically, the bacteria removing water discharge device may be applied to the floor of the shower room, the sink of the kitchen, the water receiving part of the water supply facility such as the wash stand, the hand washer, the bowl portion of the toilet bowl other than the wash place floor of the bath room, and is encompassed within the scope of the invention as long as they fall within the feature of the invention.

The components included in the respective embodiments previously described can be combined within the extent of the technical feasibility and these combinations are also encompassed in the scope of the invention as long as they fall within the feature of the invention.

INDUSTRIAL APPLICABILITY

According to the embodiment, a bacteria removing water generation device capable of preventing generation of the polka-dotted residual water on the water receiving part after a long time passes from operation finish of the bacteria removing water generation device and the water receiving part dries even if the bacteria removing water is discharged in an aspect of high retentivity

EXPLANATION OF LETTERS OR NUMERALS 10 bacteria removing water discharge part
10e end position
10p rotation reference part
10q protrusion
10s origin
10x rotation axis
11 first water discharge port
11g groove
12 second water discharge port
12g groove
13 water storage part
15 rotation reference defining means
17 motor
20 bacteria removing water generating part
30 controller
35 operation part
51 water supply pipe
52 hot-water supply pipe
53 stop cock
54 solenoid valve
55 pressure regulator valve
56 check valve
θ1 maximum rotation angle
θ2, θ3 angle
100 bacteria removing water discharge device
500 bath room
510 bathtub
520 wash place floor
521 drain port
530, 530a counter
531 top plate
532 lower cover
533 supporting material
534 rotation reference defining part
540 range
541 to 544 first to fourth wall
D1 to D5 range of rotation angle
R1 to R5 region of wash place floor
S01 origin setting mode
S02 first bacteria removing water discharge step
S03 water stop step
S04 mode of origin setting
S05 second bacteria removing water discharge step
S06 bacteria removing water discharge completing step
S07 residual water drain mode
S17 first vibration step
S27 second vibration step
ST1 to ST4 state

The invention claimed is:

1. A bacteria removing water discharge device used for a water supply facility, the device comprising:
a bacteria removing water generating part denaturing tap water to generate bacteria removing water;
a bacteria removing water discharge part, the part including a water storage part storing the bacteria removing water temporarily, a water discharge port discharging the bacteria removing water stored in the water storage part onto a water receiving part of the water supply facility; and
a controller, the controller executing a bacteria removing mode discharging the bacteria removing water from the bacteria removing water discharge part to the water receiving part, and a residual water drain mode draining at least a portion of the bacteria removing water remaining in the water storage part after executing the bacteria removing mode, wherein the controller vibrates the bacteria removing water discharge part in the residual water drain mode, wherein the residual water drain mode includes a first vibration step, in the first vibration step the bacteria removing water discharge part is vibrated while changing a position of the water discharge port so that the bacteria removing water remaining in the water storage part is discharged onto the water receiving part, and wherein the residual water drain mode includes a second vibration step, the second vibration step is executed after the first vibration step, in the second vibration step a vibration different from a vibration generated in the bacteria removing water discharge part in the first vibration step is generated in the bacteria removing water discharge part.

2. The bacteria removing water discharge device according to claim 1, wherein the controller moves the position of the water discharge port in multiple directions in the second vibration step, and a range of movement of the water discharge port in the second vibration step is narrower than a range of movement of the water discharge port in the first vibration step.

* * * * *